Dec. 28, 1954  L. A. PALDANIUS  2,698,188
RETRACTING AUXILIARY WHEEL FOR MOTORCYCLES
Filed June 12, 1952  3 Sheets-Sheet 1
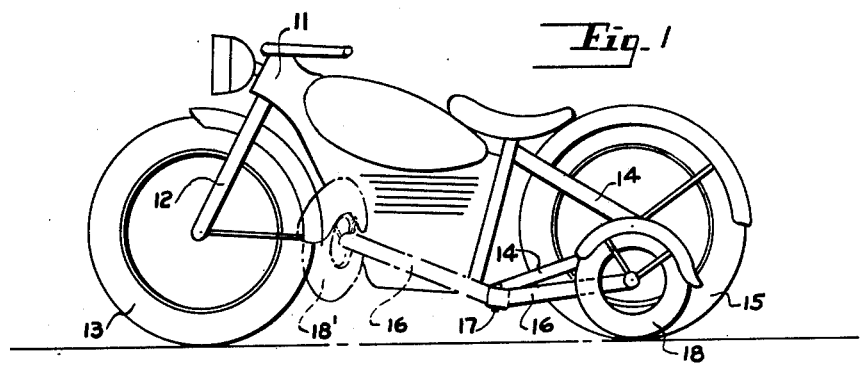
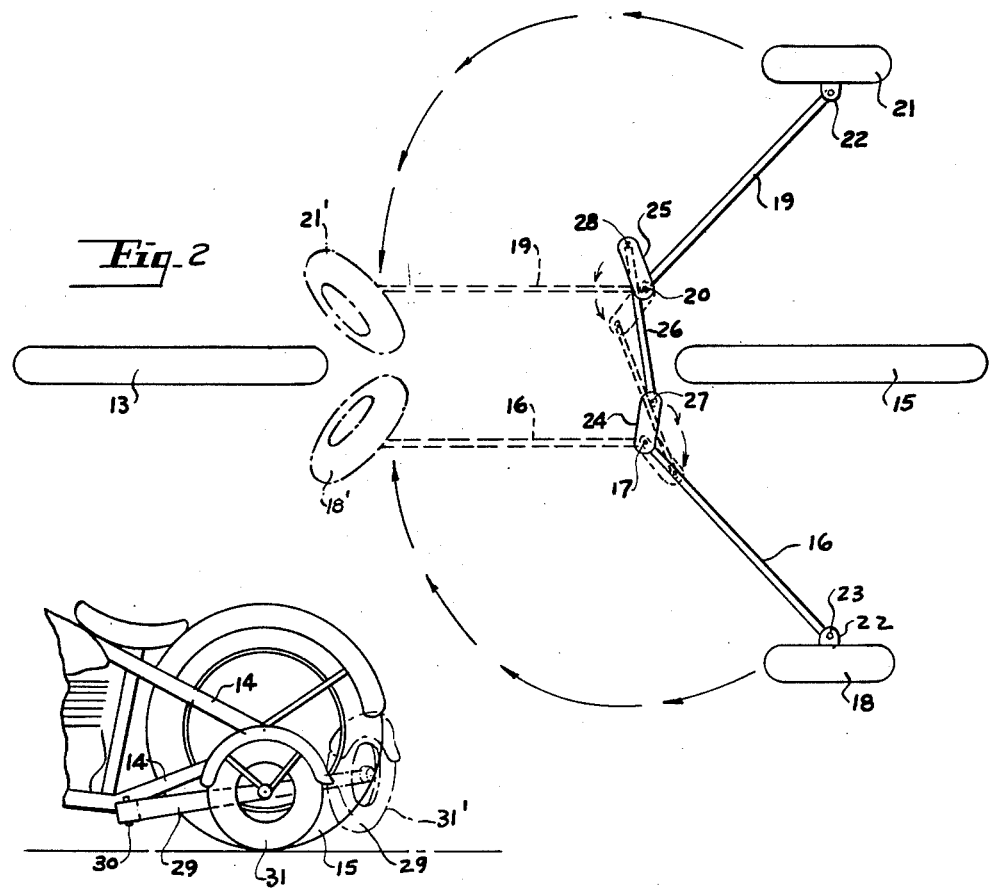
INVENTOR.
LEO A. PALDANIUS
BY
*Robert A. Sloman*
ATTORNEY.

Dec. 28, 1954   L. A. PALDANIUS   2,698,188
RETRACTING AUXILIARY WHEEL FOR MOTORCYCLES
Filed June 12, 1952   3 Sheets-Sheet 2
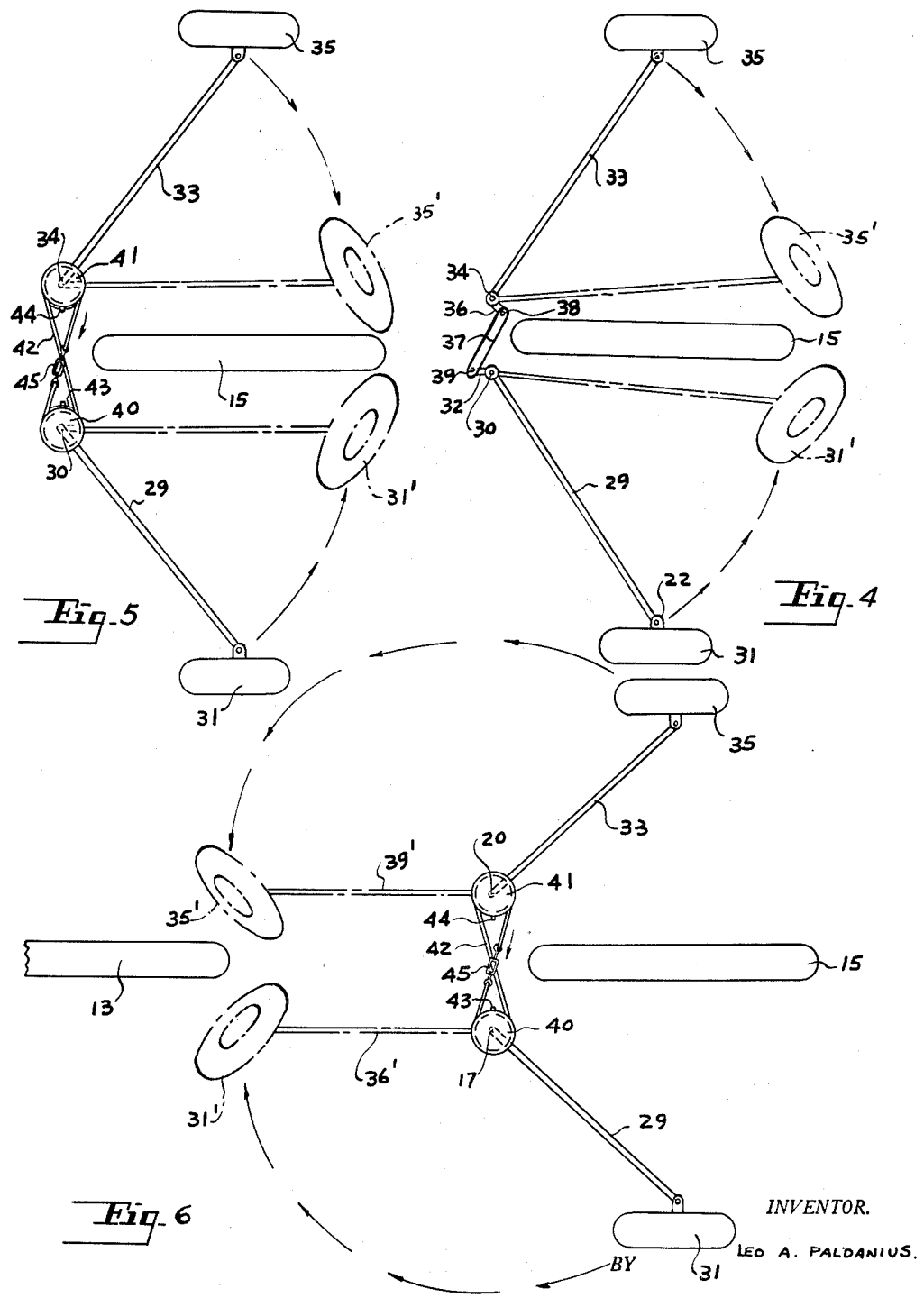
INVENTOR.
LEO A. PALDANIUS.
BY Robert A. Sloman
ATTORNEY

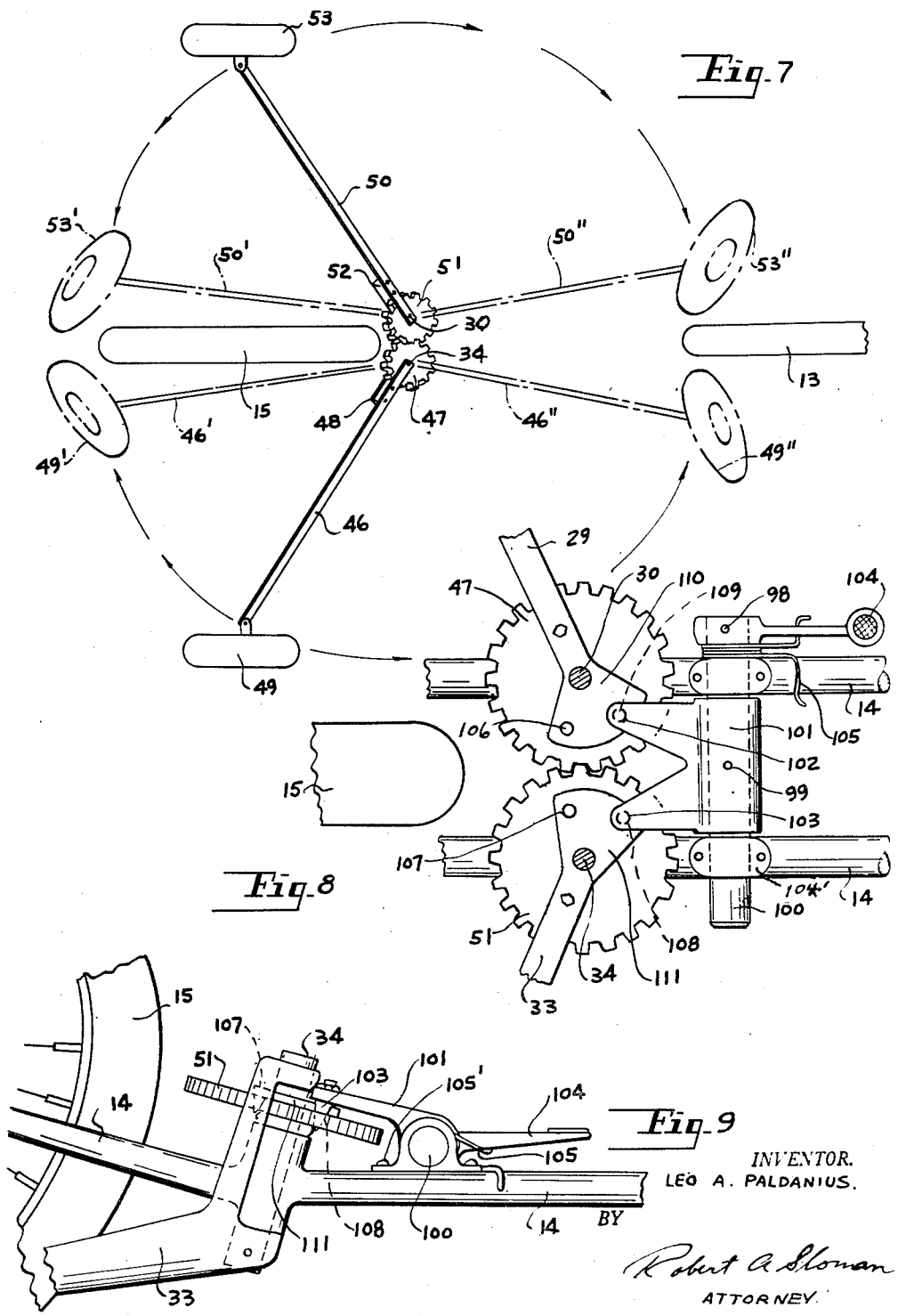

United States Patent Office 2,698,188
Patented Dec. 28, 1954

2,698,188

RETRACTING AUXILIARY WHEELS FOR MOTORCYCLES

Leo A. Paldanius, Port Huron, Mich.

Application June 12, 1952, Serial No. 293,116

2 Claims. (Cl. 280—303)

This invention relates to motorcycles, motor-scooters, or motor-bikes provided with retracting auxiliary side wheels arranged on opposite sides thereof.

It is the object of the present invention to increase the utility and safety of such vehicles by the provision of retracting auxiliary side wheels upon opposite sides thereof to make them more easily and safely handled on rough and slippery terrain, such as ice or snow or under conditions where it is necessary or desirable to proceed slowly, or merely as an aid in parking.

It is the further object of the present invention to provide retracting auxiliary side wheels for motorcycles or the like wherein said side wheels may be employed as an attachment for existing vehicles, or on the other hand may be incorporated in the initial manufacture of the vehicle.

It is the further object of this invention to provide retracting auxiliary wheels for vehicles of this type which when extended cooperate with the other two wheels of the vehicle for providing an improved support for the vehicle. It is the further object of this invention to provide a mechanism whereby these wheels may be easily retracted together with mechanism whereby the manual or mechanical retraction of one auxiliary wheel will effect an automatic retraction of the other auxiliary wheel and its supporting axle.

It is the further object of this invention to provide an auxiliary side wheel mounting upon opposite sides of such vehicle, whereby said auxiliary wheels may be retracted rearwardly for registry substantially with the vehicle body upon opposite sides thereof; or on the other hand may be so constructed and arranged as to permit forward retraction thereof for substantial registry with the body of the vehicle.

It is the further object of this invention to provide suitable mechanism for retaining the auxiliary side wheels in their fully expanded position together with mechanism for releasing the same permitting the retraction thereof.

These and other objects will be seen from the following specification and claims in conjunction with the appended drawings in which:

Fig. 1 is a side elevational view of a conventional motorcycle illustrating one of the retracting auxiliary wheels and also showing the collapsed position thereof when folded forwardly to the retracted position.

Fig. 2 is a schematic plan view illustrating the relationship of the auxiliary wheels with respect to the motorcycle front and rear wheels, together with the linkage for interconnecting said auxiliary wheels and their pivotal mountings upon the vehicle.

Fig. 3 is a fragmentary side elevational view similar to Fig. 1 and illustrating the relative positioning of the retractable side wheel when collapsed rearwardly of the open position.

Fig. 4 is a schematic plan view of the mounting and linkage for the retractable side wheels when collapsed rearwardly as in Fig. 3.

Fig. 5 is a schematic plan view of the retractable auxiliary wheels and linkage when adapted for rearward collapsing and illustrating a pulley and cable connection between the wheel supports.

Fig. 6 is a similar schematic plan view illustrating the pulley and cable connections between the wheel mountings illustrating the construction when the auxiliary wheels are retracted forwardly.

Fig. 7 is a plan schematic illustration of the auxiliary wheel mounting illustrating substantially another mechanism for effecting retraction of the auxiliary wheels either forwardly or rearwardly.

Fig. 8 is a fragmentary diagrammatic plan view illustrating one means of securing the auxiliary wheel supports in fully open and closed positions; and Fig. 9 is a side elevational view thereof.

It will be understood that the above drawings illustrate merely a preferred embodiment of the invention, and that other embodiments are contemplated within the scope of the claims hereafter set forth.

Referring to the drawings, Fig. 1 illustrates a motorcycle with a body or frame generally indicated at 11, a front wheel supporting fork 12 rotatably supported thereon and depending therefrom with a wheel 13 journaled within said fork.

The body also includes the rear frame elements 14 shown in Fig. 1 between which the rear wheel 15 is journaled and supported in a conventional manner.

A pair of outwardly and rearwardly extending axles 16 and 19 are arranged upon opposite sides of frame elements 14 and are pivotally mounted at their inner ends upon said frame as by the pivotal connections 17 and 20 shown in Figs. 1 and 2. It will be noted that the pivots 17 and 20 are inclined or arranged in a plane at an acute angle to the ground plane upon which the vehicle moves.

By this construction when the axles 16 and 19 are retracted into parallel relation with the vehicle frame 11—14, the axles 16 and 19 will be elevated to the dotted line position shown in Fig. 1.

Wheels 18 and 21 are arranged parallel to and spaced outwardly from rear wheel 15 upon its opposite sides and are journaled upon the wheel supports 22 which are fixedly connected as at 23 to the outer ends of axles 16 and 19 respectively. Thus in the outwardly extended position of axles 16 and 19, it will be apparent from Fig. 1 that the auxiliary wheels 18 and 21 will roll upon the ground plane and thereby will cooperate with the front and rear wheels 13 and 15 to provide the auxiliary lateral supports for the vehicle.

Figs. 1 and 2 illustrate the mounting of the auxiliary axles in such a manner that said axles may be collapsed into parallel relation with the vehicle frame by forward rotary movement thereof upon their pivotal supports 17 and 20 till the wheels 18 and 21 assume the dotted line positions 18' and 21' shown in Fig. 2, corresponding to the dotted line positioning thereof shown in Fig. 1. The axles 16 and 19 have cantilever extensions 24 and 25 rigidly secured thereto for rotation in unison therewith about their respective pivotal mountings 17 and 20. The free ends of the cantilever extensions 24 and 25 are interconnected by the control link 26, which is pivotally joined at one end at 27 to extension 24 and pivotally joined at its opposite end at 28 to extension 25.

From an examination of Fig. 2, it is apparent that a manual or mechanical forward rotary movement of either of the axles 16 or 19 will effect a corresponding forward pivotal movement of the other axle until the two auxiliary wheels reach their elevated dotted line positions shown in Fig. 2. It must be remembered that the extensions 24 and 25 are integral with or fixedly connected to the respective axles 16 and 19 for rotation in unison about the pivotal mountings 17 and 20 respectively.

Fig. 3 fragmentarily illustrates the same vehicle construction shown in Fig. 1 except that there are employed a pair of oppositely arranged outwardly and rearwardly extending axles 29 and 33, Fig. 4, which are pivotally mounted at their inner ends upon the inclined pivot mountings 30 and 34 respectively. It will be noted in this case also that the pivots 30 and 34 are inclined or lie in a plane which is inclined at an acute angle to the ground plane so that when the axles are inwardly collapsed into substantial parallel relation with the vehicle frame rearwardly thereof, that the auxiliary wheels 31 and 35 similarly journaled upon the outer ends of said axles, will also be elevated above the ground plane and will assume the dotted line positions 31' and 35' as illustrated in Figs. 3 and 4.

Here also there is provided a linkage between axles 29 and 33 which is similar to that shown in Fig. 2 and which includes the integral cantilever extensions 32 and 36 on axles 29 and 33 which are interconnected at the outer ends of said extensions by the control link 37. Said link is pivotally journaled at one end at 38 to cantilever extension 36 and pivotally journaled at its opposite end at 39 to cantilever extension 32. It is readily apparent from an examination of the schematic illustration of Fig. 4 that the manual or mechanical rearward collapsing of either of the auxiliary axles 29 and 33 will effect a corresponding rearward collapsing movement of the other axle until said axles are in substantial parallel relation with the vehicle frame 14.

Fig. 5 is also a schematic illustration of the same auxiliary axles 29 and 33 adapted for rearward collapsing the same as in Fig. 4, but employing a different type of connection between said axles for effecting opening and closing movements in unison.

Axles 29 and 33 are pivotally mounted at their inner ends upon the same inclined pivot mountings 30 and 34 as above described with respect to Figs. 3 and 5, which will assure the elevation of the wheels when in their collapsed dotted line positions 31' and 35' of Fig. 5. Axles 29 and 33 are fixedly secured at their inner ends to the pulleys 40 and 41 respectively which are arranged with their axes corresponding with the pivotal mountings 30 and 34. A suitable cable 42 is looped several times around each of the pulleys 40 and 41 and as indicated at 43, and portions of said cables are firmly anchored to said pulleys by means of a suitable fastening element 44 to prevent slippage between the cable and the respective pulleys. The free ends of the cable 42 are interconnected by the adjustable turnbuckle 45 for regulating the tension in said cable. It is apparent from an examination of Fig. 5, that collapsing pivotal movement of either of the axles 29 or 33 will effect a corresponding collapsing pivotal movement of the other axle inasmuch as the pulleys 40 and 41 are fixedly secured to said axles respectively for movement in unison about the pivotal mounting axes 30 and 34.

It naturally follows that the manual or mechanical opening or extending movement of either of said axles will effect a corresponding simultaneous movement of the other axle.

Fig. 6 illustrates schematically a similar arrangement except that here the auxiliary axles 29 and 33 are adapted for forward pivotal movements about their pivot mountings 17 and 20 respectively to assume the dotted line relationship shown in Fig. 6. Naturally, in collapsing the axles forwardly it is desirable that the auxiliary wheels 31 and 35 be elevated in their dotted line collapsed positions 31' and 35', and consequently the pivotal mountings for the axles 29 and 33 must be the same as that shown in Figs. 1 and 2 where the auxiliary wheels are forwardly collapsed and elevated.

It will be noted also that the pulleys 40 and 41 are similarly interconnected by the crossed cable 42 which has several turns upon each pulley and the free ends of which are interconnected by the adjustable turnbuckle 45, exactly as in Fig. 5.

Fig. 7 illustrates still another mechanism for interconnecting the auxiliary axles 46 and 50 schematically. Each of said axles have secured upon their inner ends the gears or gear sectors 47 and 51 which are in mesh with each other at all times and are of the same dimension. Bracket elements 48 and 52 are provided for effectively securing said gears to the ends of said axles in the manner illustrated in Fig. 7. Similarly, the auxiliary wheels 49 and 53 are respectively journaled in fixed position upon the outer ends of axles 46 and 50 respectively and are spaced outwardly from and parallel to the vehicle rear wheel 15, as shown. Upon manual or mechanical rearward collapsing movement of either of the axles 46 or 50 to the dotted lines positions 46' and 50' respectively, there will be effected a corresponding collapsing movement of the other axle. For rearwardly collapsing said axles, the latter are pivotally mounted upon the vehicle frame by means of the pivotal mountings 30 and 34 corresponding to the illustrations in Figs. 3, 4 and 5 wherein the axles are rearwardly collapsed and the inclinations of the pivotal mountings are such that the auxiliary wheels 49 and 53 will be elevated when in their dotted line collapsed positions 49' and 53'.

Fig. 7 also illustrates the same construction of gears 47 and 51 which will permit simultaneous forward collapsing of said axles to the dotted line positions 46" and 50" respectively. The only difference is that instead of the pivotal mountings 30 and 34, it is necessary to employ a pivotal mounting inclined as are pivotal mountings 17 and 20 in connection with Figs. 1, 2 and 6 wherein it is desirable that upon the forward collapsing movements of said axles the auxiliary wheels 49 and 53 will be elevated in their dotted line collapsed positions 49" and 53".

It is also contemplated that a suitable locking device be provided associated with the inner ends of the axles, such as at axes 30 and 34, which will be effective for retaining said axles in their outwardly expanded or collapsed positions.

One means of so locking said axles is illustrated in Figs. 8 and 9 wherein there is fragmentarily shown the swingable axles 29 and 33 upon their pivotal mountings 30 and 34 with respect to the frame elements 14. And this drawing also shows the cantilever extensions 110 and 111 corresponding to the extensions 32 and 36 in Fig. 4.

Rotative shaft 100 is arranged transversely of and extends across the frame elements 14 and is rotatably journaled and supported thereon by the two bearings 104' which are secured upon the respective frame elements 14 as by the screws or rivets 105'.

Said shaft 100 has secured thereto the rearwardly extending plate 101, such as by the transverse pin 99. Said plate is bifurcated at its end, and from the outer portions of said bifurcations depend respectively a pair of locking pins 102 and 103 which are preferably tapered and adapted for cooperative registry within the pair of transverse openings 109 and 108 formed within the cantilever extensions 110 and 111 respectively for maintaining the swingable axles 29 and 33 in their outwardly extended position as shown in Fig. 8. Lever 104 is mounted at its end upon the rockable shaft 100 and is secured thereto as by the transverse pin 98. The coiled spring 105 is mounted upon the shaft 100 with its respective ends engaging lever 104 and one of the frame elements 14 for normally maintaining the shaft 100 in such position that the locking pins 102 and 103 are in registry within the corresponding locking openings 109 and 108 in the extensions 110 and 111 respectively. It also follows that said pins will fall into registry within said openings when the extensions 110 and 111 are rotated to such position that their openings 108 and 109 will be in alignment with the respective pins 102 and 103.

In the illustration of Fig. 8 it is apparent that the axles 29 and 33 may be rearwardly collapsed to substantial parallel relation with each other and with the axis of the vehicle frame. This collapsing will occur through an arch of approximately 60 degrees, for illustration, and consequently there are provided upon the extensions 110 and 111 a second pair of transverse openings 106 and 107 which are adapted to receive the depending pins 102 and 103 whereby the axles 29 and 33 will be maintained in their collapsed positions and effectively locked. Consequently, the openings 106 and 107 will be arranged in the same arc, that is 60 degrees, with respect to the corresponding openings 109 and 108.

Fig. 8 is based primarily upon the illustration of Fig. 7 which shows that the swingable axles may be collapsed rearwardly.

Fig. 4 shows the swingable axles 29 and 33 with their cantilever extensions 32 and 36. Fig. 8 shows the same swingable axles 29 and 33 yet with a slightly different cantilever extension 110 and 111 corresponding thereto. These latter extensions are of sufficient width as to provide for the transverse locking openings 109, 108, 106 and 107 to be formed therethrough adapted for cooperatively receiving the locking pins 102 and 103 which depend from the plate of 101.

The present locking device may likewise be used where the swingable axles are interconnected at their inner ends by the intermeshing gears, such as the gears 47 and 51 of Fig. 7.

For purposes of illustration Fig. 8 also shows the two gears 47 and 51 as secured upon the ends of the axles 29 and 33 and arranged in intermeshing relation. It is contemplated furthermore that the very same transverse openings 106, 107, 108 and 109 could similarly be formed transversely through the two gears.

The present locking device is also adaptable for securing the swingable axles when interconnected by pulleys 40 and 41 such as illustrated in Figs. 5 and 6.

Figs. 8 and 9 illustrate one type of locking device; and it is contemplated that other types of locking mechanisms could be employed for the same purpose.

Having described my invention, reference should now be had to the claims which follow for determining the scope thereof.

I claim:

1. In a motorcycle having a frame with aligned front and rear wheels journaled thereon, outwardly and rearwardly extending axles arranged upon opposite sides of said frame pivotally mounted on axes inclined in relation to the horizontal at their inner ends upon said frame, auxiliary wheels journaled upon the outer ends of said axles parallel to said rear wheel when in an extended position and adapted for cooperative supporting movement upon the ground plane in such outward position, intermeshing gears secured upon the inner ends of said axles, each gear having a pair of spaced arcuately arranged transverse locking apertures extending therethrough, a horizontally disposed rock shaft journaled and supported upon said frame, a plate secured at one end to the periphery of the shaft and having its other end projecting longitudinally of the frame over said gears, and spaced locking pins depending from said projecting end of said plate and selectively positionable within one of the apertures of each of said gears for securing said axles in open and collapsed positions alternately.

2. In a motorcycle having a frame with aligned front and rear wheels journaled thereon, outwardly and rearwardly extending axles arranged upon opposite sides of said frame pivotally mounted on axes inclined in relation to the horizontal at their inner ends upon said frame, auxiliary wheels journaled upon the outer ends of said axles parallel to said rear wheel when in an extended position and adapted for cooperative supporting movement upon the ground plane in such outward position, interconnected operating members upon the inner ends of said axles, each having a pair of spaced arcuately arranged transverse locking apertures extending therethrough, a horizontally disposed rock shaft journaled and supported upon said frame, a plate secured at one end to the periphery of the shaft and having its other end projecting longitudinally of the frame over said operating members, spaced locking pins depending from said projecting end of said plate and selectively positionable within one of the apertures of each of said operating members for securing said axles in open and collapsed positions alternately, a lever secured to said rock shaft for manually disengaging said pins from said apertured members, and a spring anchored at one end upon said frame and with its other end operatively engaging said lever normally urging said plate to engagement with said operating members.

References Cited in the file of this patent

UNITED STATES PATENTS

| Number | Name | Date |
|---|---|---|
| 602,784 | Trapp | Apr. 19, 1898 |
| 649,909 | Bultzingslowen | May 22, 1900 |
| 1,622,383 | Jeske | Mar. 12, 1926 |

FOREIGN PATENTS

| Number | Country | Date |
|---|---|---|
| 114,006 | Germany | Oct. 8, 1900 |
| 516,139 | France | Dec. 3, 1920 |